May 28, 1929.　　　　O. S. TONN　　　　1,715,258
FASTENING DEVICE
Filed Aug. 1, 1928　　　2 Sheets-Sheet 1
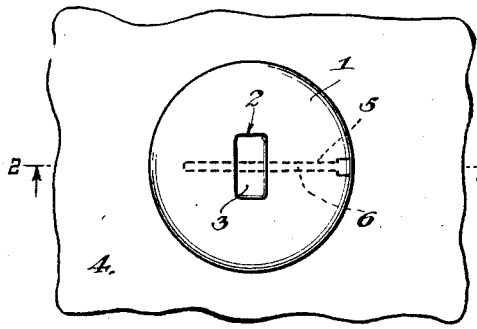
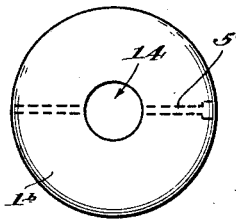
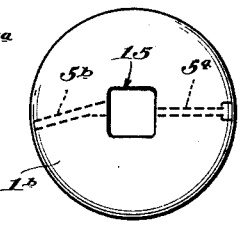
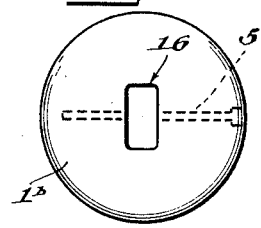
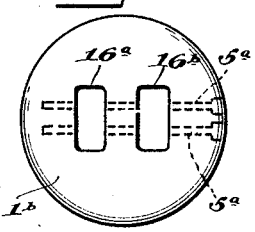
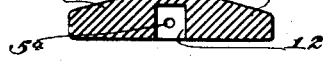
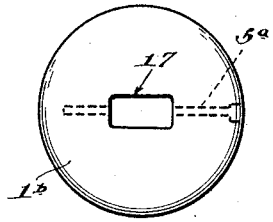
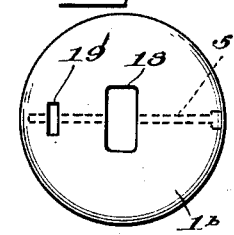
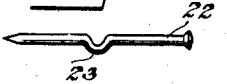
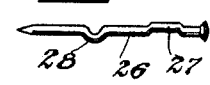
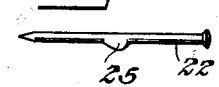
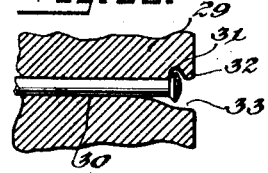
WITNESSES
Jos. L. Lamia
INVENTOR
O. S. Tonn
BY
ATTORNEY May 28, 1929.    O. S. TONN    1,715,258
FASTENING DEVICE
Filed Aug. 1, 1928    2 Sheets-Sheet 2
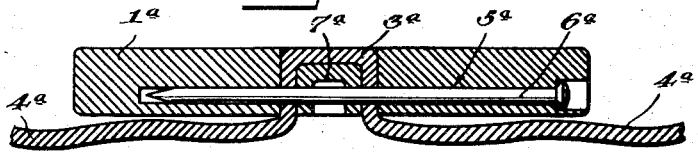
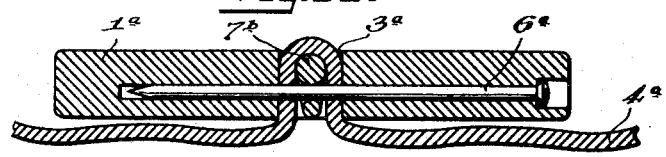
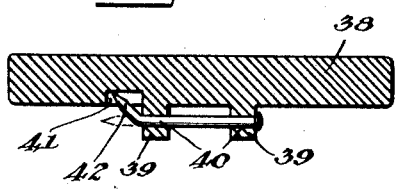
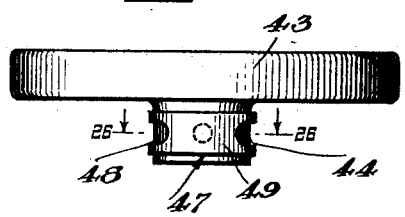
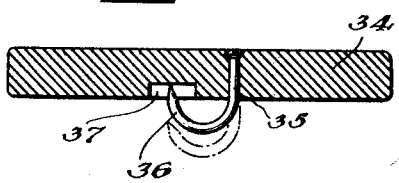
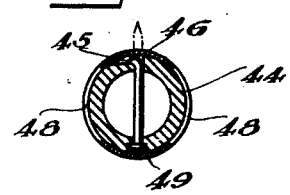
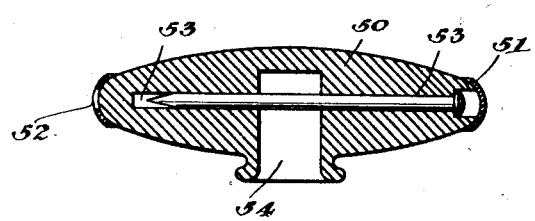
WITNESSES
Jos. L. Lamia
INVENTOR
O. S. Tonn
BY Munn & Co
ATTORNEY Patented May 28, 1929.

1,715,258

UNITED STATES PATENT OFFICE.

OTHAR S. TONN, OF DURBAN, NATAL, SOUTH AFRICA.

FASTENING DEVICE.

Application filed August 1, 1928, Serial No. 296,786, and in Great Britain March 14, 1928.

This invention relates to button and similar type fastening devices, and is more particularly concerned with "threadless" fastening devices of button and allied types which can quickly and strongly be secured to a supporting fabric by pin type fastening elements.

The invention in its broad aspects is capable of embodiment in numerous forms, a number of which will be later referred to. From one view point, a feature of the invention consists in the provision of a button type fastener having spaced walls forming a recess to receive a fold of the supporting fabric with a pin type fastening element insertible through a bore traversing said recess and through the fold of supporting fabric within the recess. The spaced walls may be part of the main body of the fastener or project therefrom. The shape of the recess defined by the spaced walls may be widely varied and more than one recess and fastener may be used as desired.

In further development of the invention, and as an additional feature, means is provided for reinforcing the fold of supporting fabric and taking the strain of the pin therefrom. The reinforcing means are inserted in the recess with the fold of fabric and receive the fastening pin therethrough. They may assume specifically different, although generally similar forms, some of which provide for bending or "kinking" the fastening pin to lock it in the recess.

The fastening pin-type elements and the recess traversing bores that receive them may vary in cross section. The pin elements themselves may be provided with locking bends, nubs or kinks to spring through into the recesses and provide abutments preventing accidental retraction, or they may be provided with angled portions to be used with correspondingly angled traversing bores. Other locking means may be also used such as abutments at the entrance of the bore, etc.

The basis of the invention and its fundamental structural features are therefore subject to a relatively wide range of variation and equivalents of which a number will be briefly discussed as illustrating the possibilities of variation and as indicating the scope of the invention.

The features above referred to and the structural variations of the basic form of the invention will be more clearly apparent from the following detailed specification which is to be read in conjunction with the accompanying drawings forming part thereof, and in which:—

Figure 1 is a top plan view of what may be termed a basic form fastening device of the invention as applied to a supporting fabric.

Figure 2 is a vertical section through the button-type fastener and the fabric support to which it is attached in accordance with the invention, the section being taken on the line 2—2 of Figure 1.

Figures 3–8 inclusive are transverse vertical sections through button-type fasteners having varying body cross sections and varying forms of recesses therein for reception of the fold of supporting fabric, the recess traversing bores which receive the pin fasteners being shown in elevation.

Figure 9 is a bottom plan view of a button fastener with circular central fabric receiving recess and a diametric traversing bore shown in dotted lines and extending entirely through the button.

Figure 10 is a similar view of a button fastener with squared central recess and angled pin bore traversing the recess and extending entirely through the fastener.

Figure 11 is a similar view with elongated rectangular recess centrally traversed by a pin bore terminating short of the edge of the button.

Figure 12 is a bottom plan of a button fastener having similar dual elongated rectangular recesses in parallel traversed by similar dual pin bores.

Figure 13 is a bottom plan of a button fastener having an elongated rectangular fabric recess traversed by a pin bore extending in the line of elongation of the recess.

Figure 14 is a plan view similar to that of Fig. 11 with the button provided with a supplemental recess traversed by a pin bore and affording means for crimping and locking the pin through the insertion of a suitable bending tool therein.

Figures 15 and 16 are elevations of pin-type fastening elements having centrally positioned locking crimps or bends therein of different angularities and suitable for use with the types of fasteners shown in Figures 1 and 9, 11, 13 and 14.

Figure 17 is an elevation of an angled pin type fastener such as may be used in conjunction with angled traversing bores as shown in Figure 10.

Figure 18 is a view in elevation of a pin fastener having spaced locking bends or crimps such as may be used in conjunction with spaced dual fabric recesses as shown in Figure 12.

Figure 19 shows a pin fastener provided with an intermediate locking nub or abutment by swagging.

Figure 20 is a fragmentary view in section and on an enlarged scale showing a bend and locking shoulder formed at the entrance end of a traversing pin bore with the head of the pin seated in its final position relatively to the shoulder.

Figure 21 is a transverse vertical section on an enlarged scale through a button fastener and its supporting fabric, similar to that of Figure 2 and showing a modified form of reinforcing element for the fabric fold in the button recess, providing for crimping or bending of the pin fastener to lock it in its bore.

Figure 22 is a similar view showing a further modification of the reinforcing element having a similar function.

Figure 23 is a transverse vertical section through a button fastener having the spaced walls providing the fabric fold recess outstanding from the body of the button and traversed by a pin bore, the body having an adjacent recess into which the end of the pin fastener is bent and held locked.

Figure 24 shows in transverse vertical section, a button fastener having a relatively shallow recess and a pin fastener extending vertically through the button and bending up into the recess.

Figure 25 is a view in side elevation of a button fastener having a tubular stem providing a fabric recess and a locking ring to overlie the traversing pin bore.

Figure 26 is a transverse horizontal section through the stem and ring of Figure 25, on the line 26—26.

Figure 27 is a transverse vertical section through a modified form of button fastener with central fabric recess, body traversing bore and a rim bore closing ring.

Basically, the fastener comprises, as shown in Figure 1, a button-type fastener 1 having a recess 2 therein providing spaced walls to receive a fold 3 of a securing fabric 4. The body of the fastener is formed with a pin bore 5 having an enlarged entrance and extending inwardly from one edge of the fastener to traverse the fabric fold recess and to extend therebeyond. A pin type fastener 6 (Figure 2) extends through the bore and recess and through the fold of fabric in the recess to secure the fastener to the supporting fabric. Preferably, the fold of fabric is reinforced by a liner, which as shown in Figure 2, is in the form of a plug 7 fitting within the fold 3 and penetrated by the pin fastening element 6, thereby taking part of the supporting strain from the fold of fabric. This liner may be of various materials—both metallic and non-metallic—as the material of the fastener and securing fabric and its intended use may dictate. As shown in Figure 21, the button type fastener $1^a$ has an opening centrally therethrough providing a recess receiving the fold $3^a$ of the securing fabric $4^a$. A cup shaped reinforcing liner $7^a$ which may be of bone or metal is provided with a bore therethrough offset from the center of its longitudinal median line and alining with the bore $5^a$ traversing the recess $3^a$, through which bore the securing pin $6^a$ extends. In Figure 22, where the central recess $3^a$ is of slightly different cross section, the reinforcing liner $7^b$ for the fold $3^a$ of the fabric $4^a$ may take the form of an eye ring of tapering cross section resembling a pearl in shape, the pin bore being off center as in Figure 21 to receive the pin element $6^a$. In both of these forms, the fabric fold recess extends through the button type fastener and the eccentric bore of the reinforcing liners alines with the pin bores for the insertion of the pins therethrough, after which the pin may be set or bent in the recess by pressure applied through the recess and liner to the pin. This constitutes one form of means for retaining the pin element in its bore and in fold engaging position in the recess. Other forms for this purpose will be described later.

The specific form of the button-type fastener, of the fabric fold recess therein and of the relative position of the traversing bore thereto may vary within reasonably wide limits. In Figures 3–8 inclusive in each of which, a button-type fastener $1^a$ and traversing bore $5^a$ is shown, the recess may extend entirely through the button as shown in Figures 3 and 4, and may be of uniform diameter as shown at 8, Figure 3, or may taper as shown at 9, Figure 4. Or the recess may extend upwardly from the bottom face of the fastener less than the full thickness of the fastener (Figures 5–8). Where the fastener is of slight thickness, a relatively shallow recess 10 (Figure 5) will be employed, or it may be tapered as at 11, Figure 6, to increase the height and permit a deeper recess 12 without weakening the button structure. Additional thickness providing for increased depth of recess can be secured, also, by crowning the button as in Figures 7 and 8. The edges of the recess at the bottom face may merge into the bottom face on a curve as at 13, Figures 7 and 8 to facilitate the insertion of the fold of fabric.

The cross section of the fabric fold recess is variable within wide limits and more than one recess may be employed, if desired. In Figures 9-14, a round button-type fastener designated 1ᵇ is shown in bottom plan view. In Figure 9, a central recess 14 circular in cross section is used; in Figure 10, a recess 15 square in cross section; and in Figure 11, the recess 16 is in the cross sectional form of an elongated rectangle, the direction of whose lengths may be changed through a ninety degree angle as shown at 17, in Figure 13. These recesses are all traversed by pin pores 5ᵃ as in the forms previously referred to. The fastener may have more than one recess and more than one pin bore. In Figure 12, a pair of spaced parallel recesses 16ᵃ and 16ᵇ is shown, traversed by a pair of parallel pin bores 5ᵃ, each recess being traversed by both bores and their pins.

As illustrative of other means for retaining the fastening pin element in its bore and recess along the line of that shown in Figures 21 and 22, attention is called to the supplemental recess 19 formed in the bottom face of the button 1ᵇ in Figure 14, adjacent to and substantially in parallel with its central fabric fold recess 18. The pin bore 5ᵃ traverses both recesses 18—19 and extends beyond the supplemental recess 19. By inserting a suitable tool in recess 19 the pin fastener, once inserted, may be bent or crimped and thereby retained in its bore and in holding relation to the fold of fabric.

The pin bore may also be formed with a bent portion 5ᵇ as in Figure 10, extending from a point at one side of the fold recess alined with a straight portion of the bore at the opposite side and having its entrance at the wall of the recess widened to facilitate entry of the pin therein.

Such a bore arrangement may have a pin fastener such as 20 in Figure 17 which has an angled end 21 corresponding to the bore 5ᵇ, and of a length permitting its insertion through the straight portion 5ᵃ of the bore and entry into the angled portion 5ᵇ, the bend in the pin joining its straight and angled portions permitting it to spring until the point has been fully inserted through the angled portion of the bore, said bend then extending in the central recess.

The bore, however, need not be angled. Instead, the pins 22 in Figures 15, 16 and 19, may be formed with a central projection formed in Figure 15 by a curved bend 23; in Figure 16, by an angled bend 24; and in Figure 19 by a swagged portion 25. For use with dual fold recesses such as shown in Figure 12, a pin 26, having dual opposed bent portions 27 and 28 spaced in accordance with the spacing of the recesses, may be employed.

As a supplement to these pin retaining means, or as a separate means, per se, the button type fastener such as 29, Figure 20, may have the enlarged entrance to its pin bore 30 provided with an annular upper recess 31 for the head of the pin, this recess being backed by a retaining wall or flange 32, and the opposed side of the bore entrance being formed with an outward bevel 33 to enable the pin to be inserted at an angle under tension and to be sprung into the recess 31 when inserted.

A form of fastener and recess which may be used when a fairly small strain is to be applied to the pin element securing the fastener body to the fabric fold is shown in Figure 24, in which a pin element 35 inserted vertically through the thickness of the button fastener 34 has its lower and pointed end bent upwardly at 36 and inserted into a relatively shallow recess 37, in the bottom face of the fastener 34 into which the securing fabric is inserted and held by the upwardly bent end 36 of the pin element which may be sprung out of the recess to release the fabric and fastener.

The fabric fold recess may be in a plane removed from that of the main body of the fastener as by providing an extension or neck portion. In Figure 23, the fastener 38 is provided with depending spaced lugs or walls 39 forming a fold receiving recess therebetween, this recess being traversed by alined pin bores 40 in said walls. Adjacent to and beyond one of the lugs or walls 39, the bottom face of the fastener 38 is formed with a shallow recess into which the bent end 42 of the fabric securing pin may be bent upwardly for retention.

In Figures 25 and 26, the extension is formed by a tubular neck portion 44 depending from the main body of the button fastener 43. This neck provides a fold receiving recess which is traversed by alined pin bores, one bore at its exit end having a circumferential slot 45 to receive the bent end 46 of the securing pin. A pin retaining ring 47 frictionally engaging the neck 44 and having slotted portions 48 alining with the pin bores and closed portions 49 closing the pin bores may be used as a pin retaining means.

A locking ring 51 is also shown as frictionally embracing the peripheral edge of the main body of a button fastener 50 in Figure 27, this ring having a slotted portion 52 alining with the pin bore 53 traversing the fabric fold recess 54.

The pin bores as shown may extend partly, or entirely, through the body of the button fastener, the latter form being shown in Figures 23-26. The term "pin" is used in the sense of a pin type stem or shanked fastening element and its size and cross section will vary. These pins will preferably be pointed to facilitate penetration of the fabric and of resilient metal. The term button-type fastener is intended to include fastening devices which like a button may be mounted on a securing fabric or other pliable material by means such as disclosed herein.

The scope and physically variable nature of the structure has been fully brought out by the varying forms presented herein.

What I claim, therefore, and desire to secure by Letters Patent is:

1. A button-type fastener having spaced walls providing a recess to receive a fold of securing fabric, and having a transverse bore therein extending through the walls of and traversing said recess, with a pin-type element extending through said bore and recess and through the fold of fabric in said recess and provided intermediate of its end with a lateral offset forming an abutment to engage the wall of said recess and resist withdrawal.

2. A button-type fastener having a recess therein to receive a fold of securing fabric, a bore extending inwardly from one edge of said fastener traversing and extending beyond said recess, and a pin-type fastening element extending through said bore and through a fold of fabric in said recess and provided with a crimp therein forming an abutment engaging the wall of said recess to retain the pin against withdrawal therefrom.

3. A fastener of the type described comprising a body provided with spaced walls providing a recess to receive a fold of securing fabric, a pin bore extending transversely of said body and traversing said recess and a reenforcing member positioned and lying within said recess and lining, said fold with the fabric held thereby against the recess walls, said member and fold being traversed by a fastening pin inserted through said bore.

4. A fastener of the type described comprising a body having a recess therein to receive a fold of supporting fabric and having a recess traversing bore extending inwardly from one edge through and beyond said recess to receive a fastening pin element, and a reinforcing liner for said fabric fold positioned and lying within said recess with the fabric fold held against the walls of the recess, said liner and fold being traversed by a fastening pin element inserted through said recess traversing bore.

5. A fastener of the type described comprising a body having a recess in its under side to receive a fold of securing fabric therein and having a recess-traversing bore extending inwardly from one edge to, through and beyond said recess to receive a fastening pin element, and a reinforcing liner for said fabric fold seated within said recess and fold with the fold held thereby against the walls of the recess and having a pin receiving bore therethrough to receive a pin fastener and take the strain of said pin fastener from the fabric fold.

6. A button type fastener having a recess in its underside to receive a fold of securing fabric therein, a pin bore extending through said fastener from one edge traversing and extending beyond said recess, and a reinforcing liner for the fabric fold positioned in said recess with the fabric fold held thereby against the walls of the recess, said liner having a bore therethrough to aline with said pin bore and take the supporting strain of the pin from the fabric fold, said liner being movable through pressure to form a retaining crimp in a pin inserted therethrough.

7. A button-type fastener having centrally positioned spaced walls providing a recess therebetween to receive a fold of securing fabric and having a pin receiving bore traversing said walls and recess with a fabric reinforcing liner within the recess and fold bored to aline with the recess traversing bore and receive a bore-inserted pin element therethrough, said liner being sized to hold the fabric fold against the walls of the recess and to receive in part the supporting strain of the pin.

8. A button-type fastener having a recess therein to receive a fold of securing fabric, a pin bore extending inwardly from one edge through and beyond said recess, a reinforcing element fitted within the fold of fabric with the fabric held thereby against the walls of said recess, said element lying wholly within said recess, and a pin type fastener inserted through said bore and recess and through the fabric fold and its reinforcing element.

9. A button-type fastener having spaced walls providing a recess to receive a fold of securing fabric therein, a bore extending inwardly through said walls traversing said recess and a fold of fabric therein, a reinforcing liner for said fabric fold inserted in and lying wholly within said recess within the fold with the fold held thereby against the walls of said recess and having an aperture therethrough to aline with the bore through said walls, a pin type fastener inserted through said wall bores and through the fabric fold and the aperture of its liner, and means to retain said pin in said bore and recess after insertion therein.

10. A button type fastener having a recess therein to receive a fold of securing fabric and having a pin bore therethrough traversing said recess, a reinforcing liner for said fabric fold lying within said recess with the fabric held thereby against the walls of the recess, said liner having a bore therethrough to aline with the pin bore traversing the recess, a pin type fastening element extending through said traversing bore, the fabric fold, and the alined bore of said reinforcing liner, and means to retain said fastener held within said bore in fastening relation to fold and liner.

11. A button type fastener provided with a recess therein to receive a fold of securing fabric, and a pin-type fastening element inserted through a bore in said fastener and extending through said recess and into the fabric fold therein, said pin element being provided with a bent portion within said recess abutting the wall thereof to retain the pin in holding relation to the fabric fold.

OTHAR S. TONN.